US010957925B2

United States Patent
Murata et al.

(10) Patent No.: US 10,957,925 B2
(45) Date of Patent: Mar. 23, 2021

(54) METHOD OF RUNNING-IN OPERATION OF FUEL CELL

(71) Applicants: KABUSHIKI KAISHA TOYOTA CHUO KENKYUSHO, Nagakute (JP); TOYOTA JIDOSHA KABUSHIKI KAISHA, Toyota (JP)

(72) Inventors: Hajime Murata, Nagakute (JP); Kensaku Kodama, Nagakute (JP); Manabu Kato, Susono (JP); Toshiaki Kusakari, Suntou-gun (JP)

(73) Assignees: KABUSHIKI KAISHA TOYOTA CHUO KENKYUSHO, Nagakute (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 506 days.

(21) Appl. No.: 15/420,998

(22) Filed: Jan. 31, 2017

(65) Prior Publication Data
US 2017/0338499 A1    Nov. 23, 2017

(30) Foreign Application Priority Data
May 20, 2016    (JP) .............................. JP2016-101777

(51) Int. Cl.
*H01M 8/04701*    (2016.01)
*H01M 8/04029*    (2016.01)
(Continued)

(52) U.S. Cl.
CPC ... *H01M 8/04701* (2013.01); *H01M 8/04029* (2013.01); *H01M 8/0491* (2013.01);
(Continued)

(58) Field of Classification Search
CPC ......... H01M 8/04701; H01M 8/04223; H01M 8/04291; H01M 8/04029; H01M 8/04828;
(Continued)

(56) References Cited

U.S. PATENT DOCUMENTS

2012/0040260 A1* 2/2012 Morita .............. H01M 8/04029
429/414
2016/0344049 A1* 11/2016 Choo ................ H01M 8/04238

FOREIGN PATENT DOCUMENTS

JP    2001-229947 A    8/2001
JP    2002-319421 A    10/2002
(Continued)

OTHER PUBLICATIONS

Mar. 27, 2018 Office Action issued in Japanese Patent Application No. 2016-101777.
(Continued)

*Primary Examiner* — Eugenia Wang
(74) *Attorney, Agent, or Firm* — Oliff PLC

(57) ABSTRACT

First, a reaction gas is supplied to a fuel cell stack including a laminate of solid polymer electrolyte fuel cells and power generation is performed so that a temperature of the fuel cell stack reaches 65° C. or higher (heating power generation step). Next, the reaction gas is supplied to the fuel cell stack and the power generation is performed under a condition in which relative humidity is 100% or more (cleaning power generation step). Cooling water of room temperature may be supplied to the fuel cell stack from the outside before the cleaning power generation step is performed after the heating power generation step is completed, or after the cleaning power generation step is completed (quenching step).

10 Claims, 11 Drawing Sheets

(51) Int. Cl.
  *H01M 8/04291*   (2016.01)
  *H01M 8/04828*   (2016.01)
  *H01M 8/04223*   (2016.01)
  *H01M 8/04858*   (2016.01)
  H01M 8/1018     (2016.01)
  H01M 8/04791    (2016.01)

(52) U.S. Cl.
  CPC ... *H01M 8/04223* (2013.01); *H01M 8/04291* (2013.01); *H01M 8/04828* (2013.01); H01M 8/04798 (2013.01); H01M 2008/1095 (2013.01); Y02P 70/50 (2015.11)

(58) Field of Classification Search
  CPC ....... H01M 2008/1095; H01M 8/0491; H01M 8/04798; Y02P 70/56
  See application file for complete search history.

(56) References Cited

FOREIGN PATENT DOCUMENTS

| | | |
|---|---|---|
| JP | 2005-340022 A | 12/2005 |
| JP | 2009-009891 A | 1/2009 |
| JP | 2009-054471 A | 3/2009 |
| JP | 2010-192221 A | 9/2010 |
| JP | 2013-026209 A | 2/2013 |
| JP | 2013-187037 A | 9/2013 |
| JP | 2015-511058 A | 4/2015 |

OTHER PUBLICATIONS

Oct. 23, 2018 Office Action issued in Japanese Patent Application No. 2016-101777.

\* cited by examiner

[FIG. 1]
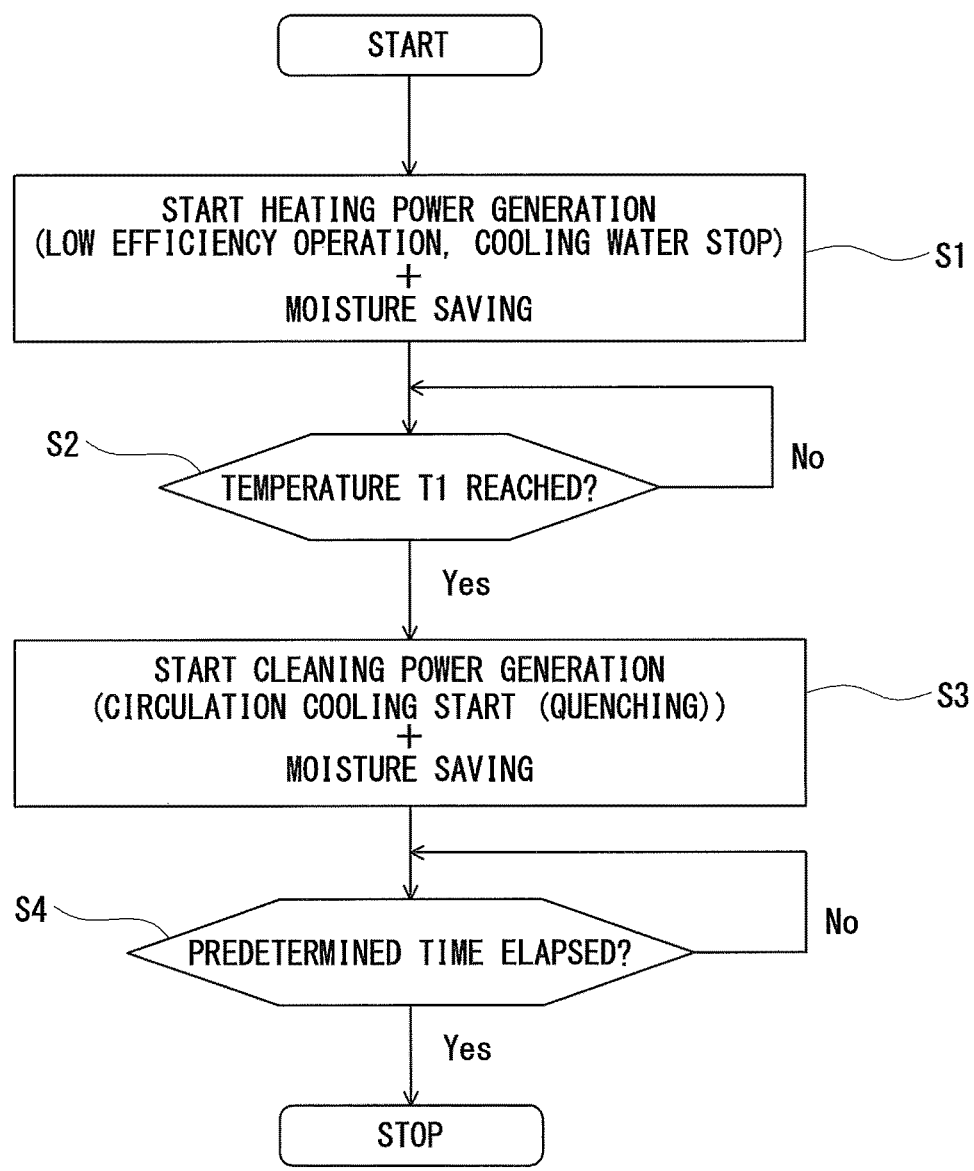

[FIG. 2]
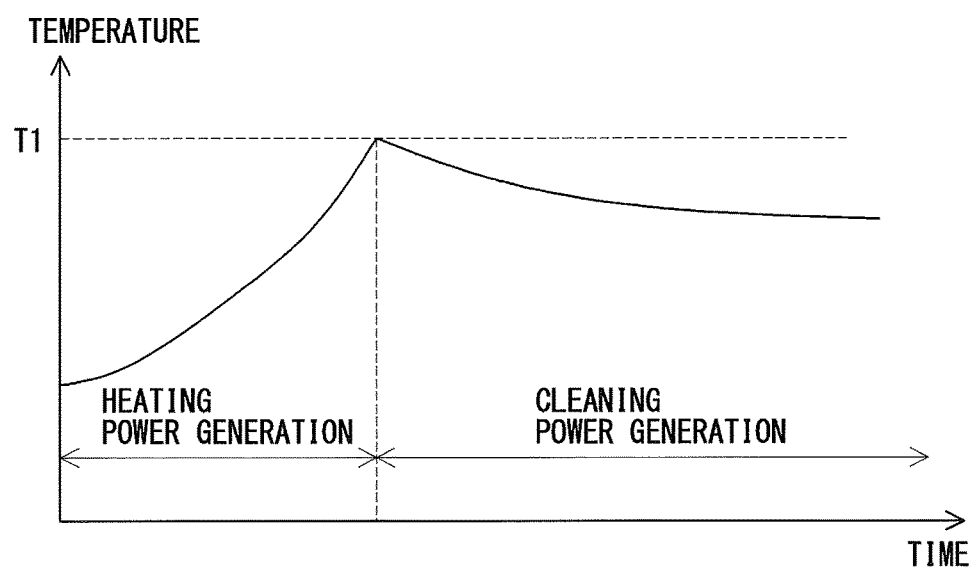
[FIG. 3]
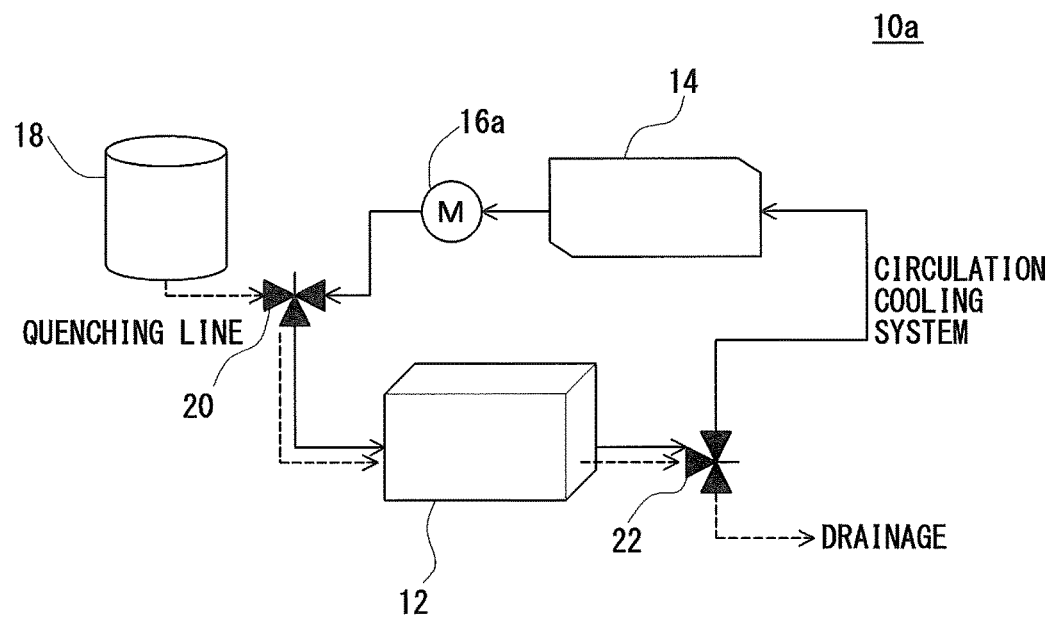

[FIG. 4]
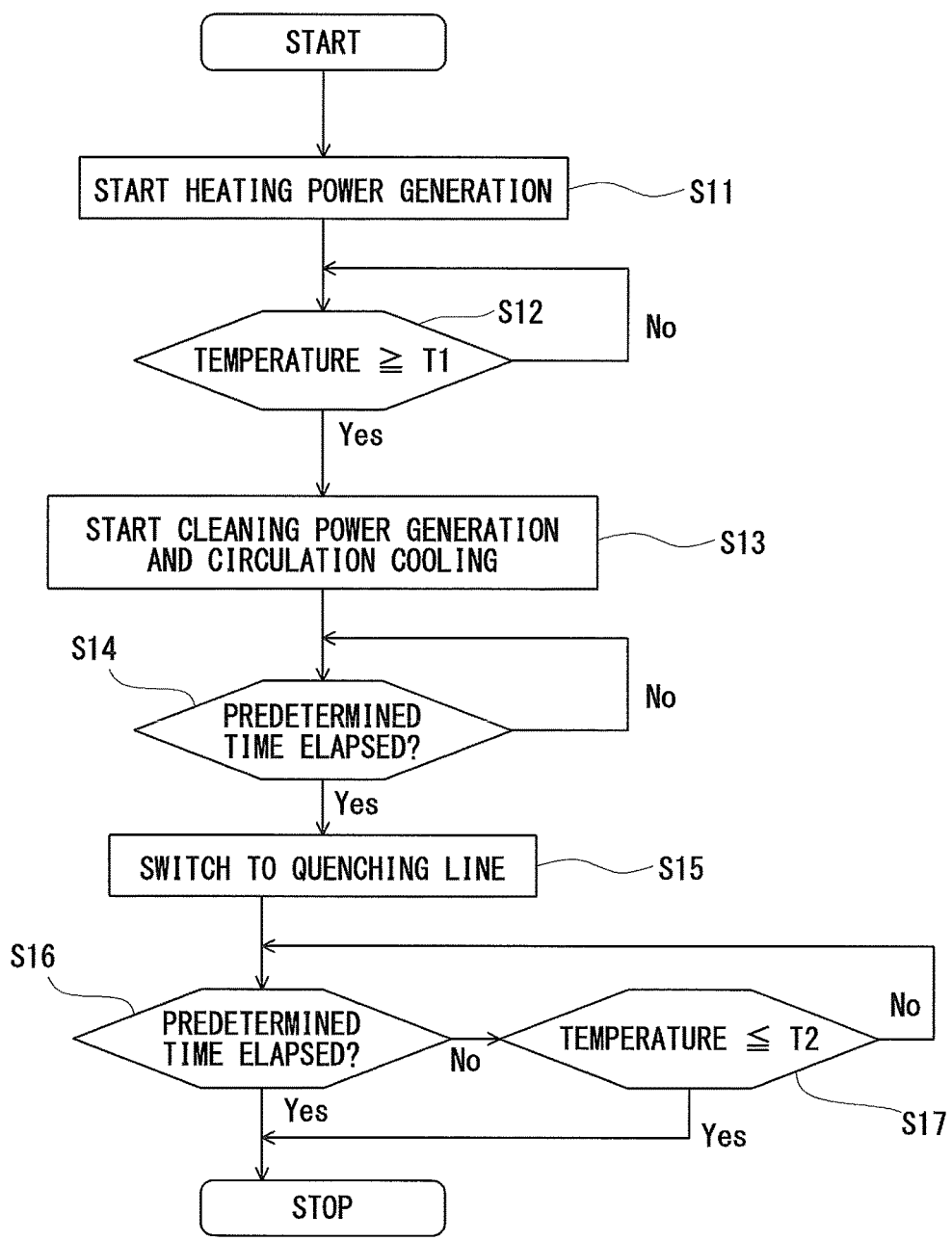

[FIG. 5]
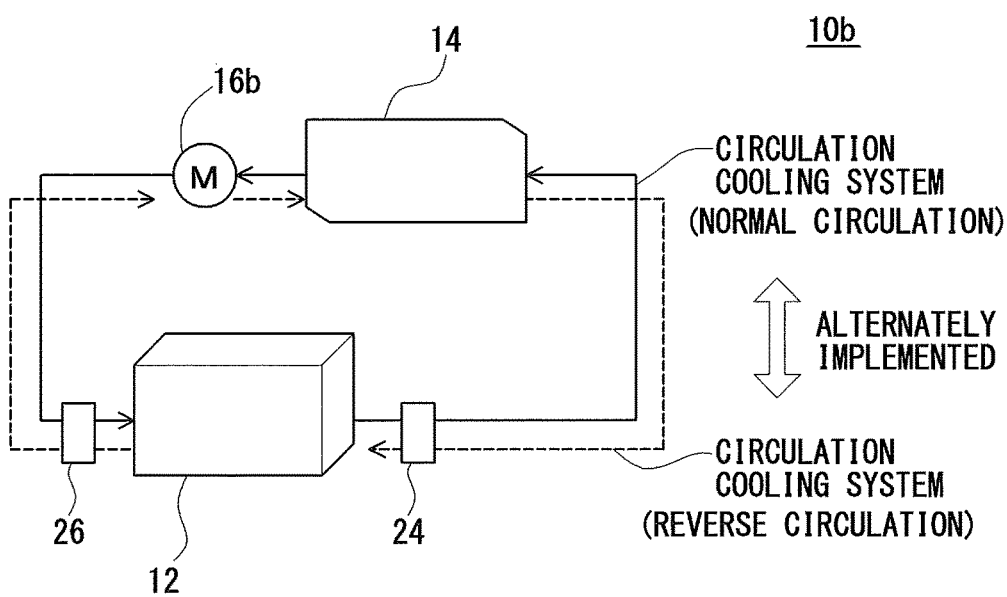

[FIG. 6]
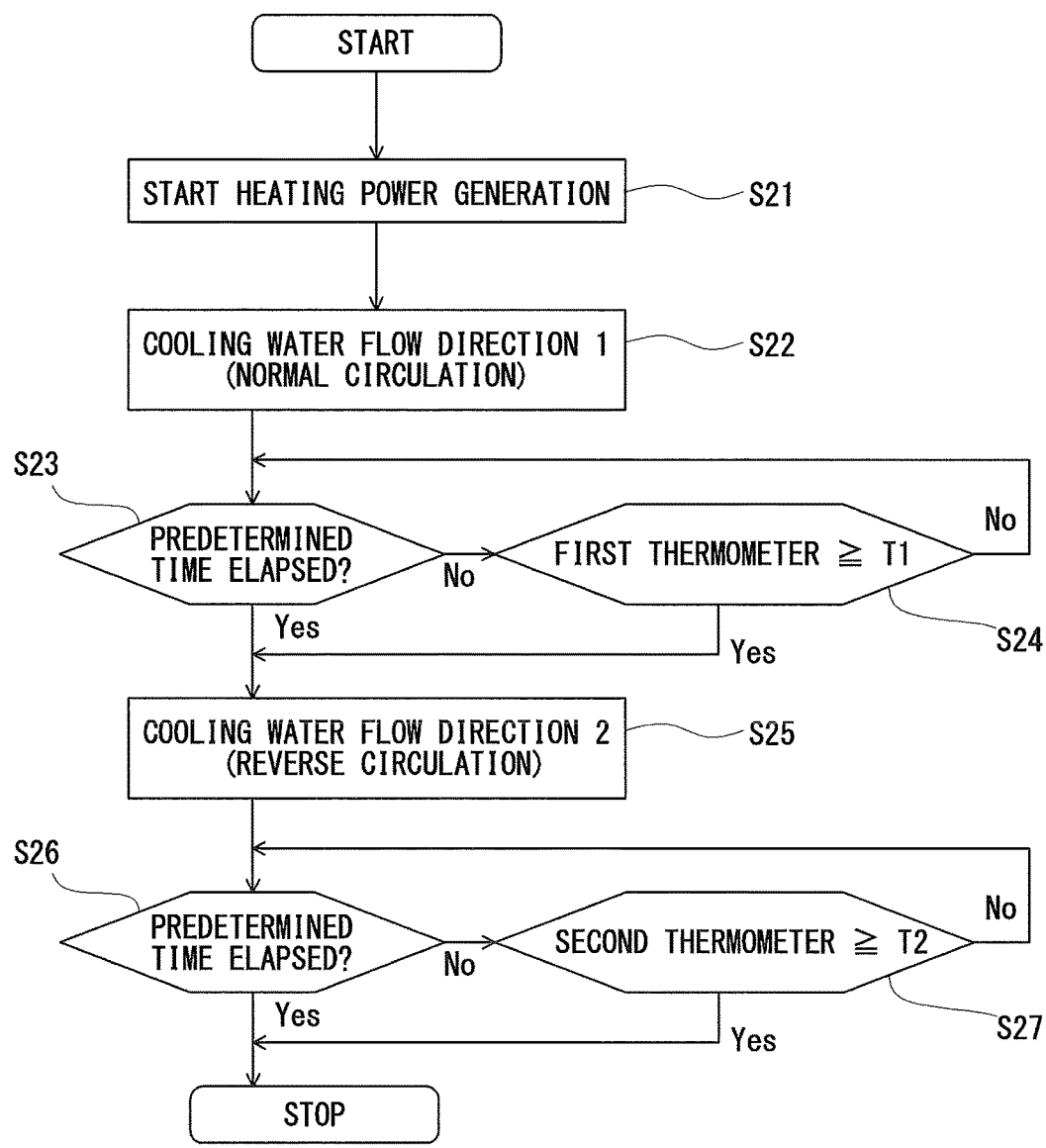

[FIG. 7]
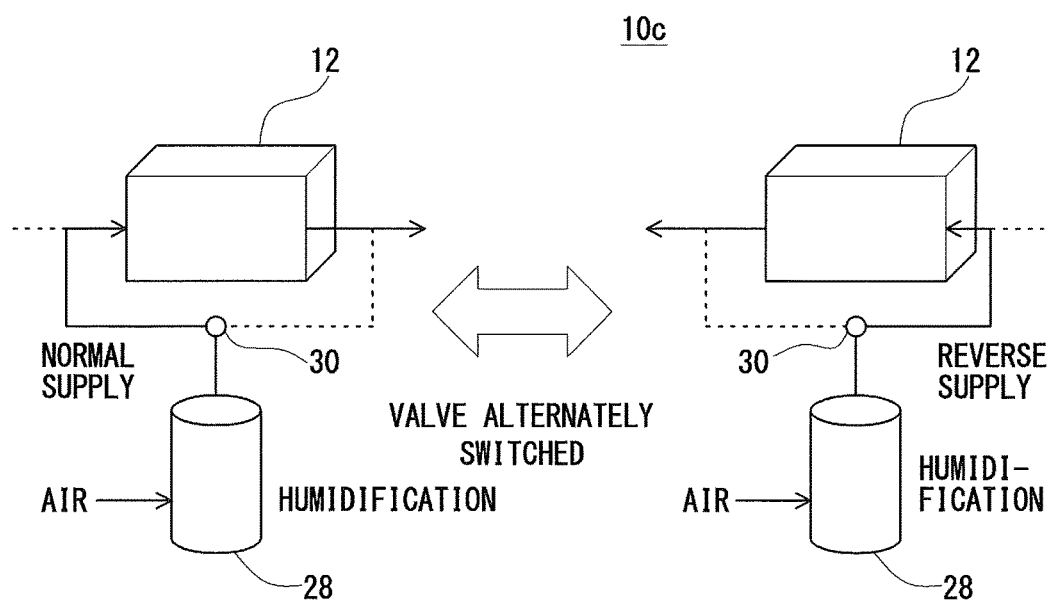

[FIG. 8]
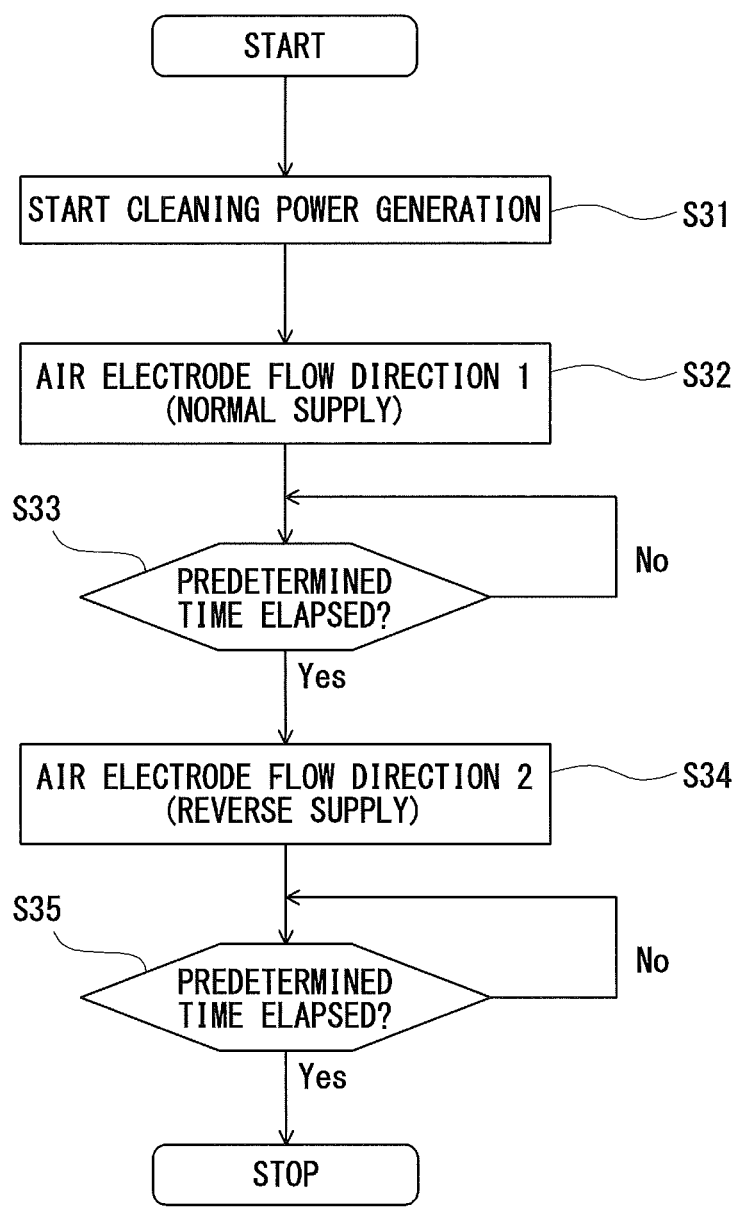

[FIG. 9]
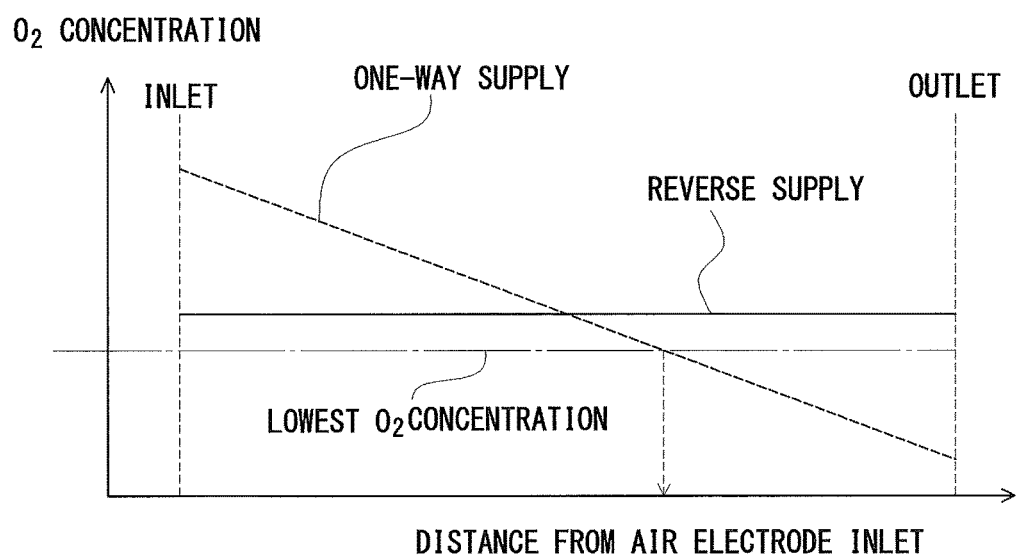

[FIG. 10]
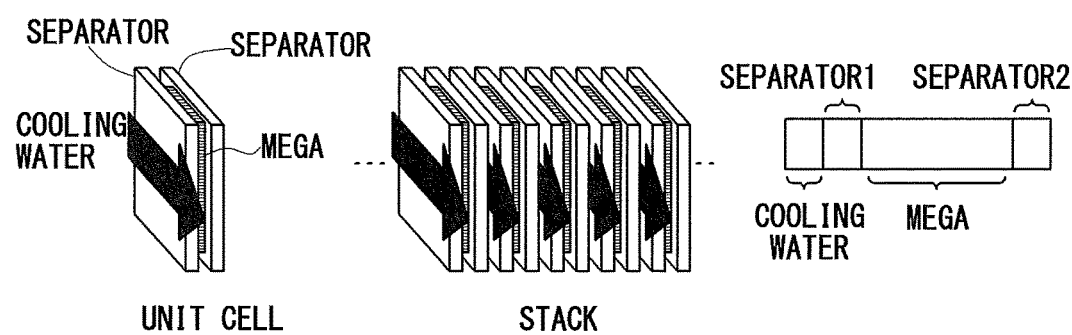
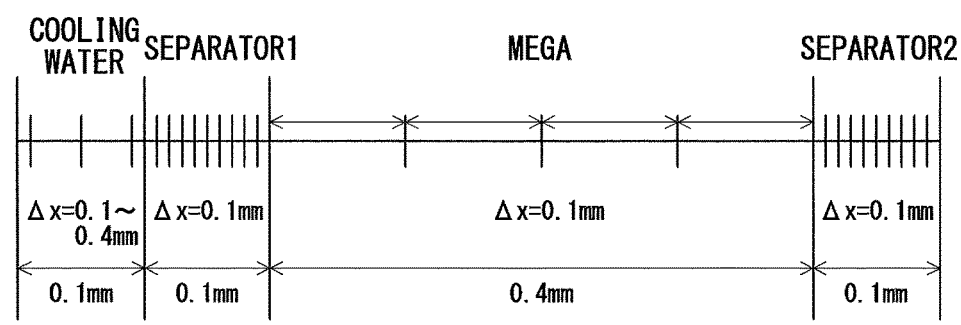
Δx : SPACE DIVISION WIDTH Δx IN DIFFERENCE METHOD CALCULATION

[FIG. 11]
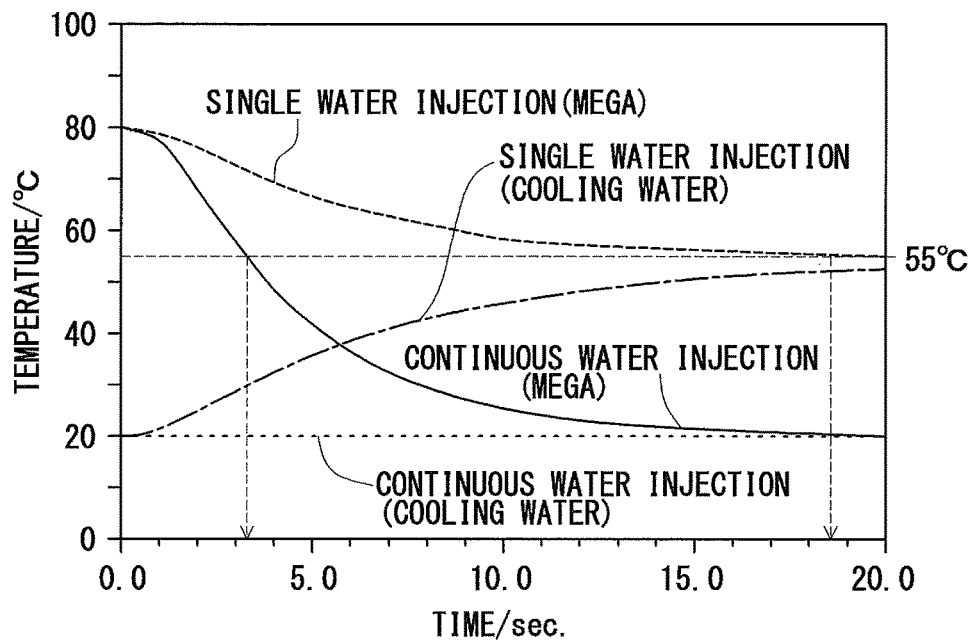
[FIG. 12]
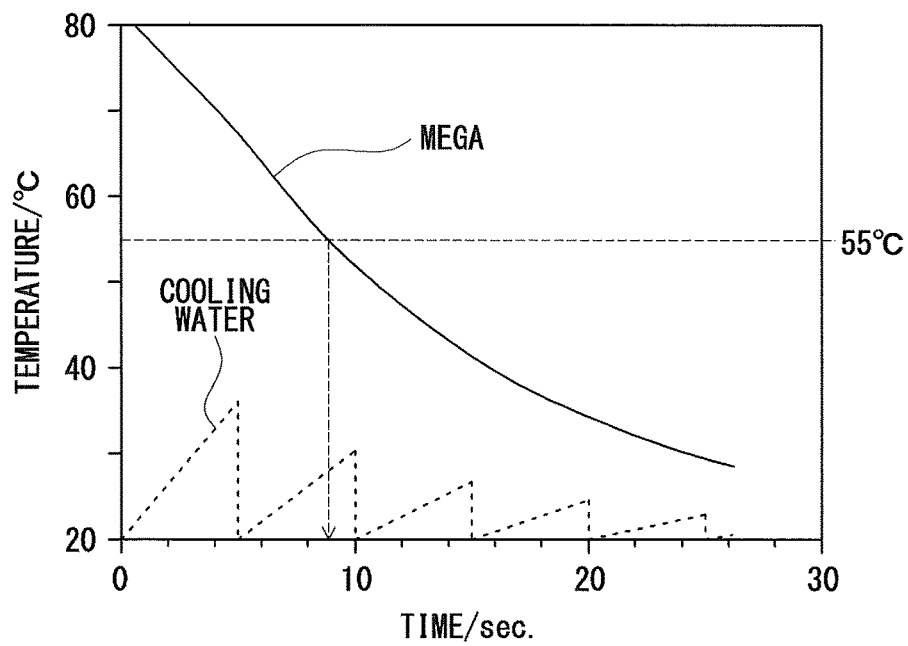

[FIG. 13]
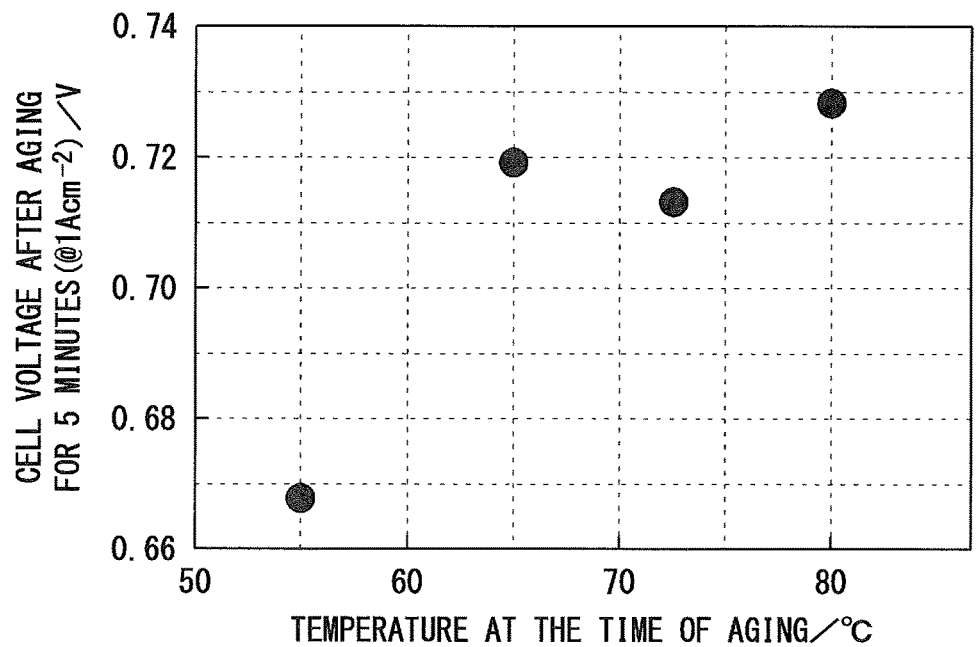
[FIG. 14]
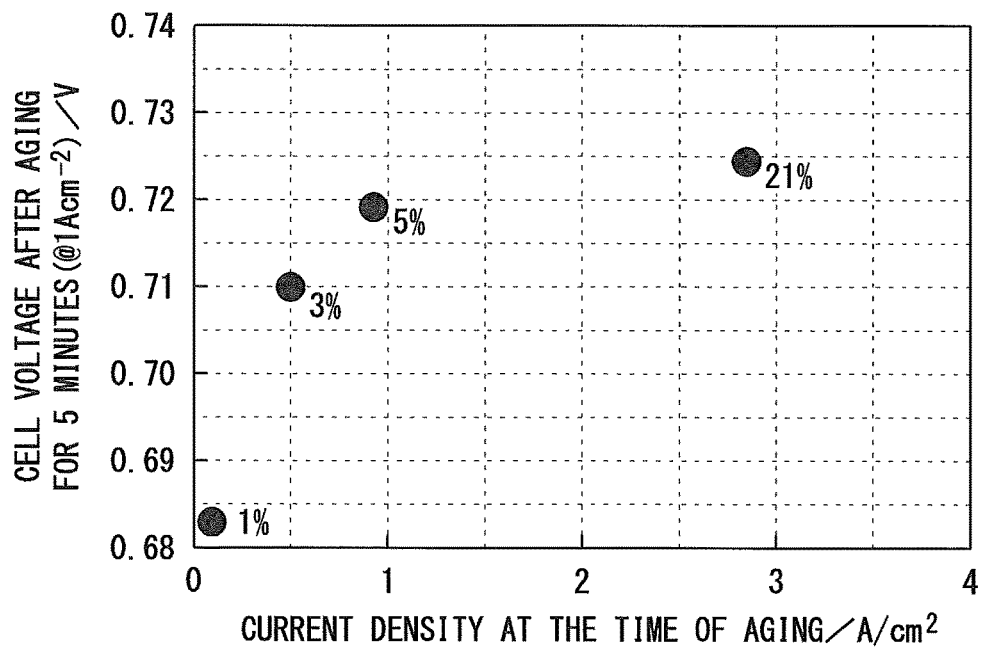

METHOD OF RUNNING-IN OPERATION OF FUEL CELL

FIELD OF THE INVENTION

The present invention relates to a method of running-in operation of a fuel cell, and more particularly to a method of running-in operation of a fuel cell which is applicable to aging of a solid polymer electrolyte fuel cell immediately after production or refreshment of a solid polymer electrolyte fuel cell whose performance has deteriorated during use.

BACKGROUND OF THE INVENTION

A solid polymer electrolyte fuel cell includes a membrane-electrode-gas diffusion layer assembly (MEGA) in which an electrode (catalyst layer) containing a catalyst and a gas diffusion layer are bonded to both sides of an electrolyte membrane. Current collectors (separators) having gas channels are further disposed on both sides of the MEGA. The solid polymer electrolyte fuel cell normally has a structure (fuel cell stack) in which multiple unit cells each having the MEGA and the current collectors are stacked on each other.

It has been known that the solid polymer electrolyte fuel cell immediately after production cannot obtain designed performance due to factors other than manufacturing defects such as an insufficient water content of an electrolyte membrane and an electrolyte in the catalyst layer as well as adsorption of a poisonous substance to the catalyst surface. For that reason, before a shipping inspection is performed on the solid polymer electrolyte fuel cell immediately after production, running-in operation (also called "aging", "conditioning", "activation", and the like) is carried out. However, the running-in operation takes a long time, which is a bottleneck in raising a production speed of the fuel cells.

Under the circumstances, in order to solve the above problem, various proposals have been made up to now.

For example, Patent Literature 1 discloses a method of starting a solid polymer electrolyte fuel cell including:
(a) connecting a fuel cell to an external circuit in which DC power supply and an electronic load are connected to each other in series;
(b) circulating warm water to increase a temperature of a measurement cell to 80° C.;
(c) gradually increasing a current density of a current flowing in an external circuit to 1.5 A/cm² while maintaining the temperature of the measurement cell at 80° C.; and
(d) performing conditioning for four hours while maintaining the current density at 1.5 A/cm².

The literature discloses that when the conditioning is performed at a current density (for example, 1.5 A/cm²) higher than the current density during the normal operation (for example, 0.1 to 1.0 A/cm² when the fuel cell is used as a power source for a traveling vehicle), since an ion exchange resin in a catalyst layer goes into a water containing state in a short time, a high output voltage is obtained at the time of the power generation.

Further, Patent Literature 2 discloses a method of activating a fuel cell stack for alternately repeating:
(a) a high humidification open circuit voltage operation stage of operating the fuel cell stack in an open circuit voltage (OCV) state to introduce droplets for activation into an interior of the stack; and
(b) a vacuum wetting stage of consuming a residual gas inside of the stack by causing a current to flow in the stack in a state of blocking hydrogen and air, and thereby evacuating the interior of the stack to wet a surface of the polymer electrolyte membrane.

The literature discloses that the above method makes it possible:
(a) to eliminate a high current density operation zone which is indispensable for the conventional activation;
(b) to activate the stack in a short time without consuming hydrogen; and
(c) to activate the stack by repeating the high humidification open circuit voltage operation stage for three minutes and the vacuum wetting stage for three minutes, each nine times.

In addition, Patent Literature 3 discloses a method of aging a fuel cell including:
(a) a step of supplying a fuel and an oxidizer to an anode and a cathode, respectively, and starting power generation of the fuel cell; and
(b) a step of periodically varying a current density in a range of 0.3 mA/cm² to 0.2 mA/cm² (a cell voltage ranging from 0.75 V to 0.9 V).

The literature discloses that:
(a) the degree of reduction in the cell voltage in a steady operation state is −5.3 mV/h when the aging process of applying a constant load (current density: 0.2 mA/cm²) for eight hours is performed whereas the degree of reduction in the cell voltage in the steady operation state is −0.7 mV/h to −1.3 mV/h when the aging process of applying a load of a square wave for 15 minutes (15 cycles with one cycle as 1 minute) is performed; and
(b) in the case where the aging is carried out by applying a periodic load, it is preferable to carry out the aging under a condition in which no flooding occurs.

In addition, Patent Literature 4 discloses a method of reversing a flow direction of a coolant in a case where the fuel cell stack is started (low temperature start) from a state in which an ambient temperature is lower than 0° C., although the method is not a running-in method for the fuel cell.

The literature discloses that:
(a) when the flow direction of the coolant is reversed at the low temperature start, a temperature distribution of a hot spot (a region higher in temperature than the other regions in the fuel cell stack) is flattened by the reversal of the coolant, and the heat dissipates around the hot spot; and
(b) as a result, the breakage of a membrane caused by excessively heating the hot spot can be suppressed.

Furthermore, Patent Literature 5 discloses a cooling system for a fuel cell including a channel switching unit that reverses a circulation direction of cooling water to be supplied to a fuel cell, although the system is not a running-in method for the fuel cell.

The literature discloses that cooling performance of the cooling water can be improved by reversing the circulation direction of the cooling water when a temperature of the cooling water for the fuel cell rises.

The aging time can be somewhat shortened with the use of the methods disclosed in Patent Literatures 1 to 3. However, an exact cause requiring a long time for aging is not necessarily clarified. For that reason, although various aging methods have been proposed, the effects obtained by the conventional methods are not sufficient.

In addition, when the fuel cell is used for a long period of time, the performance of the fuel cell is deteriorated eventually. However, there is no conventional example that has proposed a running-in method that can be applied not only to the aging of the fuel cell immediately after production but also to the refreshment of the fuel cell deteriorated over time, and moreover can refresh the fuel cell in a short period of time.

CITATION LIST

Patent Literature

[Patent Literature 1] Japanese Unexamined Patent Application Publication No. 2002-319421
[Patent Literature 2] Japanese Unexamined Patent Application Publication No. 2013-026209
[Patent Literature 3] Japanese Unexamined Patent Application Publication No. 2005-340022
[Patent Literature 4] Japanese Unexamined Patent Application Publication (Translation of PCT Application) No. 2015-511058
[Patent Literature 5] Japanese Unexamined Patent Application Publication No. 2001-229947

SUMMARY OF THE INVENTION

An object of the present invention is to shorten an aging time of a solid polymer electrolyte fuel cell immediately after production to improve a production speed of a fuel cell stack.

Another object of the present invention is to provide a running-in method applicable to refreshment of a solid polymer electrolyte fuel cell deteriorated over time.

In order to solve the above problems, a method of running-in operation of a fuel cell according to the present invention includes:

a heating power generation step of supplying a reaction gas to a fuel cell stack including a laminate of solid polymer electrolyte fuel cells and performing power generation so that a temperature of the fuel cell stack reaches 65° C. or higher; and a cleaning power generation step of supplying the reaction gas to the fuel cell stack and performing power generation under a condition in which relative humidity is 100% or more.

It is preferable that the method of running-in operation of the fuel cell further may include a quenching step of supplying cooling water of room temperature to the fuel cell stack from the outside:
(a) before the cleaning power generation step is performed after the heating power generation step is completed; or
(b) after the cleaning power generation step is completed.

When the heating power generation is performed under a predetermined condition, and the temperature of the fuel cell stack is raised to a temperature exceeding a steady operation temperature range, the poisonous substance adsorbed on the catalyst is promptly desorbed. Then, when the cleaning power generation is performed under a condition in which relative humidity is 100% or more, the poisonous substance desorbed from the catalyst is washed off with produced water before being re-adsorbed to the catalyst. As a result, a running-in time can be remarkably shortened as compared with the conventional art.

More specifically, in the case where the method includes a quenching step of supplying the water of room temperature from the outside to the fuel cell stack, dew condensation occurs in a gas channel, and a state in which the relative humidity is 100% can be easily created. In addition, since the fuel cell can be cooled down to the inspection temperature in a short time, the shipping inspection can be promptly performed after the running-in operation is completed. Further, since the method according to the present invention does not necessarily require a heat source or a humidifier, the method can be applied not only to the aging of the solid polymer electrolyte fuel cell immediately after production but also to the refreshment of the solid polymer electrolyte fuel cell mounted in various devices.

BRIEF DESCRIPTION OF THE DRAWINGS

FIG. 1 is a flowchart of a method of running-in operation of a fuel cell using control of cooling water amount;
FIG. 2 is a schematic diagram of a change in temperature during heating power generation and cleaning power generation;
FIG. 3 is a schematic diagram of a fuel cell system having a quenching line for allowing water of room temperature to flow in a coolant channel of a fuel cell;
FIG. 4 is a flowchart of a method of running-in operation of the fuel cell with the use of the fuel cell system shown in FIG. 3;
FIG. 5 is a schematic diagram of a fuel cell system including a cooling water reversing unit for reversing a flow direction of the cooling water;
FIG. 6 is a flowchart of the method of running-in operation of the fuel cell with the use of the fuel cell system illustrated in FIG. 5;
FIG. 7 is a schematic diagram of the fuel cell system including an oxidant gas reversing unit for reversing a flow direction of an oxidant gas;
FIG. 8 is a flowchart of a method of running-in operation of the fuel cell with the use of the fuel cell system illustrated in FIG. 7;
FIG. 9 is a diagram illustrating a relationship between a distance from an air electrode inlet and an $O_2$ concentration;
FIG. 10 is a model diagram of a fuel cell stack used for calculation of heat conduction;
FIG. 11 is a graph illustrating the transition of center temperatures of an MEGA and cooling water during a continuous water injection and single water injection;
FIG. 12 is a graph illustrating the transition of the center temperatures of the MEGA and the cooling water during intermittent water injections;
FIG. 13 is a graph illustrating aging temperature dependence of a cell voltage (@ 1 A/cm$^2$) after aging for 5 minutes; and
FIG. 14 is a graph illustrating current density dependence during aging of a cell voltage (@ 1 A/cm$^2$) after aging for 5 minutes.

DETAILED DESCRIPTION OF THE PREFERRED EMBODIMENTS

Hereinafter, an embodiment of the present invention will be described in detail.

[1. Method of Running-in Operation of Fuel Cell]

A method of running-in operation of a fuel cell according to the present invention includes:

a heating power generation step of supplying a reaction gas to a fuel cell stack including a laminate of solid polymer electrolyte fuel cells and performing power generation so that a temperature of the fuel cell stack reaches 65° C. or higher; and a cleaning power generation step of supplying the reaction gas to the fuel cell stack and performing power generation under a condition in which relative humidity is 100% or more.

The method of running-in operation of the fuel cell further may include a quenching step of supplying cooling water of room temperature to the fuel cell stack from the outside (a) before the cleaning power generation step is performed after the heating power generation step is completed, or (b) after the cleaning power generation step is completed.

[1.1. Heating Power Generation Step]

First, a reaction gas is supplied to a fuel cell stack including a stack of solid polymer electrolyte fuel cells, and power generation is performed so that a temperature of the fuel cell stack reaches 65° C. or higher (heating power generation step).

[1.1.1. Attainment Temperature]

It is known that the solid polymer electrolyte fuel cell immediately after production cannot obtain designed performance because the poisonous substance is adsorbed on a surface of the catalyst. In addition, if the solid polymer electrolyte fuel cell is used for a long time, the poisonous substance is eventually adsorbed on the surface of the catalyst and the performance is deteriorated. In the present invention, the heating power generation is performed for rapidly increasing the temperature of the solid polymer electrolyte fuel cell up to a temperature equal to or higher than a temperature at which the desorption of the poisonous substance is started due to heat generation during the power generation, and promoting the desorption of the poisonous substance from the surface of the catalyst.

In general, the poisonous substance adsorbed on the surface of the catalyst tends to be desorbed more as the temperature becomes higher. It is preferable that the attainment temperature at the time of increasing the temperature is higher so long as the fuel cell stack does not break. In order to complete the desorption of the poisonous substance in a short time, the attainment temperature during the heating power generation needs to be 65° C. or higher. The attainment temperature during the heating power generation is preferably 80° C. or higher.

[1.1.2. Relative Humidity]

In the solid polymer electrolyte fuel cell, the steady operation temperature is generally 50 to 60° C. For that reason, it is relatively easy to create a highly humidified state in a steady operation temperature region, particularly in a system equipped with a humidifier.

However, the temperature of the fuel cell rises with the power generation. For that reason, in a temperature range exceeding the steady operation temperature, it is difficult to produce a state in which the relative humidity is 100% or more only by water produced by power generation, particularly in a system not equipped with a humidifier.

In the present invention, in order to solve the above problem, an increase in temperature in a short period of time (quick desorption of a poisonous substance) is prioritized in the heating power generation step, and a state in which relative humidity is 100% or more is created in a cleaning power generation step to be described later. For that reason, relative humidity during the heating power generation is not particularly limited. In other words, the relative humidity during the heating power generation may be less than 100%.

[1.1.3. Power Generation Time]

In general, the desorption of the poisonous substance is completed in a shorter time as the attainment temperature during the heating power generation becomes higher. On the other hand, the power generation over a longer period of time than necessary has no difference in effect, and has no benefit. For that reason, it is preferable to select an optimum time as the power generation time of the heating power generation according to the attainment temperature.

For example, when the attainment temperature during the heating power generation is 80° C. or higher, since the desorption of the poisonous substance is almost completed when the temperature reaches 80° C. Therefore, it is possible to shift from the heating power generation to the cleaning power generation immediately. On the other hand, when the attainment temperature is relatively low, in order to complete the desorption of the poisonous substance, it is preferable to continue the heating power generation at the highest attainment temperature for a predetermined period of time.

[1.1.4. Heating Method]

As a heating method, for example, there are
(a) a method of controlling a power generation condition of the fuel cell to increase a calorific value caused by the power generation,
(b) a method of controlling a cooling condition of the fuel cell to suppress the discharge of heat caused by the power generation to the outside of the fuel cell, and the like.

In the heating power generation step, any one of those methods may be used, or two or more methods may be used in combination as far as physically possible. Hereinafter, specific examples of the heating method will be described in detail.

[A. Control of Stoichiometric Ratio of Air]

The heating power generation step may include a step of performing the power generation under a condition in which a stoichiometric ratio of air is lower than that in the steady operation. In the steady operation, a relatively high stoichiometric ratio of air (in other words, high air flow rate) is usually used in order to obtain high efficiency.

On the other hand, when the stoichiometric ratio of air is reduced (that is, the air flow rate is decreased) during the heating power generation, an outlet oxygen concentration of the fuel cell is decreased and the cell performance is deteriorated. Specifically, in the case of performing the power generation under a condition in which a current value becomes a predetermined value or more, when the stoichiometric ratio of air is reduced, a cell voltage is decreased. As a result, the efficiency of the fuel cell is decreased and a calorific value is increased.

However, when the stoichiometric ratio of air becomes too small, the oxygen concentration at an outlet of the fuel cell is decreased considerably and no power can be generated in a downstream area of a cathode gas channel. As a result, heat and water for cleaning are not generated in the downstream area of the cathode gas channel. Therefore, it is preferable that the stoichiometric ratio of air is set to a value of 1 or more, or slightly more than 1.

[B. Control of Air Utilization Factor]

The heating power generation step may include a step of performing the power generation under a condition in which the air utilization factor becomes higher than that in the steady operation. The air utilization factor is inversely related to the stoichiometric ratio of air. When the air utilization factor is increased (that is, the stoichiometric ratio of air is reduced) during the heating power generation, the oxygen concentration at the outlet of the fuel cell is decreased and the cell voltage is decreased. As a result, the efficiency of the fuel cell is decreased and the calorific value is increased.

However, when the air utilization factor becomes too high, the oxygen concentration at the outlet of the fuel cell is decreased considerably, and the power generation cannot be performed in the downstream area of the cathode gas channel. Therefore, it is preferable to set the air utilization factor to a value of 100% or less, or slightly smaller than 100%.

[C. Control of Cell Voltage]

The heating power generation step may include a step of performing the power generation under a condition in which the cell voltage becomes a desorption potential of the poisonous substance. For example, in the case of a Pt catalyst, a cell voltage of around 0.4 V corresponds to a potential at which the poisonous substance is likely to be desorbed. Therefore, when the heating power generation is performed in a state where the cell voltage is decreased to a predetermined value, the desorption of the poisonous substance is promoted. In general, when the cell voltage is decreased, the calorific value is also increased due to the decreases in efficiency.

As a method for setting the cell voltage to be equal to or less than the desorption potential of the poisonous substance, there are, for example, a method of reducing the stoichiometric ratio of air, a method of increasing the air utilization factor, and the like.

[D. Limit of the Amount of Cooling Water]

Each of the heating power generation step and the cleaning power generation step to be described later may include a step of performing the power generation while circulating the cooling water between the fuel cell stack and a heat exchanger. In that case, it is preferable that the amount of circulating cooling water in the heating power generation step is smaller than the amount of circulating cooling water in the cleaning power generation step.

Generally, the fuel cell system performs the power generation while circulating the cooling water between the fuel cell stack and the heat exchanger so as to suppress an excessive rise in the temperature of the fuel cell stack. Similarly, the heating power generation and the cleaning power generation may be performed while circulating the cooling water. In this case, when the amount of circulating water during the heating power generation is relatively reduced, the discharge of heat from the fuel cell is suppressed. As a result, the temperature of the fuel cell stack can be increased to a predetermined temperature or higher in a short time.

[E. Supply Stop of Cooling Water]

The heating power generation step may include a step of performing the power generation without allowing the cooling water to flow in the fuel cell stack. When the supply of the cooling water to the fuel cell stack is stopped during the heating power generation, the discharge of heat from the fuel cell is suppressed. As a result, the temperature of the fuel cell stack can be increased to the predetermined temperature or higher in a short time.

Meanwhile, after the heating power generation is performed without allowing the cooling water to flow in the fuel cell stack, when the cleaning power generation is performed while circulating the cooling water between the fuel cell stack and the heat exchanger, a state in which relative humidity is 100% or more can be easily created during the cleaning power generation. However, when the state in which the relative humidity is 100% or more can be created by another method, the cleaning power generation may be similarly performed without allowing the cooling water to flow in the fuel cell stack.

[F. Reversal of Flow Direction of Cooling Water]

The heating power generation step may include a cooling water reversing step of alternately repeating normal circulation for circulating the cooling water in one direction between the fuel cell stack and the heat exchanger and reverse circulation for reversing a flow direction of the cooling water.

When the cooling water cooled to a predetermined temperature by the heat exchanger is supplied to the fuel cell stack, the temperature of the cooling water rises due to the heat from the fuel cell. For that reason, the cell temperature in the vicinity of an inlet side of the coolant channel becomes low, and the cell temperature in the vicinity of an outlet side of the coolant channel becomes high. The non-uniformity of the temperature distribution in the fuel cell stack causes insufficient desorption of the poisonous substance on the low temperature portion, which causes the aging to be prolonged.

On the other hand, when the flow direction of the cooling water is reversed during the heating power generation, the temperature inside of the fuel cell stack uniformly rises, and it can be suppressed to occur the low temperature portion (in other words, a region in which the desorption of the poisonous substance becomes insufficient). As a result, the aging is completed in a shorter time than that in the conventional art.

[1.2. Quenching Step]

Next, as needed, the cooling water of room temperature is supplied to the fuel cell stack from the outside after the completion of the heating power generation or after the completion of the cleaning power generation to be described later (quenching step).

In the case of circulating the cooling water between the fuel cell stack and the heat exchanger, the temperature of the cooling water rises over time and the cooling efficiency decreases. For that reason, when the cleaning power generation is performed immediately after the heating power generation is performed with the use of the circulating cooling water, dew condensation may become insufficient. In addition, when the temperature at the time of completing the cleaning power generation is relatively high, it is necessary to cool the fuel cell before shifting to an inspection step.

On the other hand, when the cooling water of room temperature is supplied to the fuel cell stack after the completion of the heating power generation, the fuel cell stack is quenched and the dew condensation is promoted. As a result, the discharge of the poisonous substance is promoted. In addition, in the case where the quenching step is carried out after the completion of the heating power generation or after the completion of the cleaning power generation, when the cooling condition of quenching is optimized, it is possible to shift to an inspection step immediately after the completion of the cleaning power generation.

[1.3. Cleaning Power Generation Step]

Next, after the quenching step is performed as needed, the reaction gas is supplied to the fuel cell stack, and the power generation is performed under a condition in which the relative humidity is 100% or more (cleaning power generation step).

[1.3.1. Attainment Temperature]

The cleaning power generation is performed under a condition in which the relative humidity is 100% or more (in other words, under a condition in which liquid water is present in the gas channel), and is performed for discharging the poisonous substance to the outside of the fuel cell together with the liquid water before the poisonous substance desorbed from the catalyst during the heating power generation is again adsorbed to the catalyst surface. For that reason, the attainment temperature during the cleaning power generation is not particularly limited as long as the condition in which the relative humidity is 100% or more can be maintained.

However, the simplest method that can create the state in which the relative humidity is 100% or higher even in a system where a capacity of a humidifier is insufficient or in a system without the humidifier is that the temperature of the fuel cell stack is lowered after the completion of the heating power generation, and the dew condensation is promoted in the gas channel.

Also, the fuel cell immediately after production is sent to a shipping inspection step after the running-in operation is completed. The shipping inspection is generally carried out at a steady operation temperature (50 to 60° C.). In order to carry out the shipping inspection immediately after the running-in operation is completed, it is preferable to perform the cleaning power generation while cooling the fuel cell stack or perform the quenching step after the cleaning power generation is completed, so that the attainment temperature at the time of completing the cleaning power generation becomes the steady operation temperature (50 to 60° C.).

[1.3.2. Relative Humidity]

Relative humidity during the cleaning power generation needs to be set to 100% or more. There is no particular limitation on the method of setting the relative humidity to 100% or more. The details of the method for setting the relative humidity to 100% or more will be described later.

[1.3.3. Power Generation Time]

In general, the longer the power generation time during the cleaning power generation is, the more the discharge of the poisonous substance will proceed. On the other hand, the power generation for a longer time than necessary has no difference in effect and has no benefit. Therefore, it is preferable to select an optimum time as the power generation time for the cleaning power generation according to a power generation condition.

The optimum power generation time depends on the power generation condition, but sufficient effect is normally obtained only by performing the power generation for 5 to 15 minutes.

[1.3.4. Cleaning Method]

As the cleaning method, for example, there are
(a) a method of controlling the power generation condition for the fuel cell to increase the amount of water produced by the power generation,
(b) a method of controlling the cooling condition of the fuel cell to promote dew condensation in the gas channel, and the like.

In the cleaning power generation step, any one of those methods may be used, or two or more of those methods may be used in combination as far as physically possible. Hereinafter, specific examples of the cleaning method will be described in detail.

[A. Increase in Current Density]

The cleaning power generation step may include a step of performing the power generation under a condition in which the current density is 1 A/cm$^2$ or more.

Generally, as the concentration of oxygen contained in the oxidant gas increases, a current density increases more and the amount of produced water increases. As a result, the discharge of the poisonous substances is promoted. In order to obtain a high cleaning effect, it is preferable that the current density is set to 1 A/cm$^2$ or more. It is more preferable that the current density is set to 1.5 A/cm$^2$ or more.

On the other hand, even if the current density is increased more than necessary, there is no difference in the effect and there is no benefit. Therefore, it is preferable that the current density is set to 3 A/cm$^2$ or less. It is more preferable that the current density is set to 2.5 A/cm$^2$ or less.

The term "current density" as used herein refers not to an average current density in a cell plane but to a local current density. When there locally exists a low current density portion, the aging of the entire stack is delayed. As a result, it is preferable to perform the cleaning power generation so as to prevent a low current density portion from locally occurring.

[B. Increase in Amount of Cooling Water]

Each of the heating power generation step described above and the cleaning power generation step may include a step of performing the power generation while circulating the cooling water between the fuel cell stack and the heat exchanger. In this case, it is preferable that the amount of circulating cooling water in the cleaning power generation step is larger than the amount of circulating cooling water in the heating power generation step.

When a relatively small amount of cooling water is circulated during the heating power generation, the temperature of the fuel cell stack can be raised in a short time. Then, when a relatively large amount of cooling water is circulated during the cleaning power generation, dew condensation is promoted in the gas channel. As a result, the discharge of the poisonous substance is promoted.

[C. Supply Resume of Cooling Water]

In the case where the heating power generation step includes a step of performing the power generation without allowing the cooling water to flow in the fuel cell stack, the cleaning power generation step may include a step of performing the power generation while circulating the cooling water between the fuel cell stack and the heat exchanger. When the cooling water is stopped during the heating power generation, and the supply of the cooling water is restarted during the cleaning power generation, the fuel cell stack is quenched, and the dew condensation in the gas channel is promoted. As a result, the discharge of the poisonous substance is promoted.

[D. Reversal of Oxidant Gas Flow Direction]

The cleaning power generation step may include an oxidant gas reversing step of alternately repeating normal supply for allowing the oxidant gas supplied to the fuel cell stack to flow in one direction and reverse supply for reversing the flow direction of the oxidant gas.

Generally, the amount of produced water increases as the concentration of oxygen contained in the oxidant gas increases. However, when the oxidant gas is supplied to the fuel cell stack, oxygen is consumed in an electrode reaction and the oxygen concentration gradually decreases. Therefore, the amount of produced water in the vicinity of the inlet side of the cathode gas channel increases, and the amount of produced water in the vicinity of the outlet side of the cathode gas channel decreases. When an uneven oxygen concentration occurs in the fuel cell stack, the discharge of the poisonous substance in the low oxygen concentration portion becomes insufficient, which is one of the reasons for prolonging the aging.

On the other hand, when the flow direction of the oxidant gas is reversed during the cleaning power generation, the concentration of oxygen gas in the fuel cell stack becomes uniform and the low oxygen concentration portion (that is, a region in which the poisonous substance is insufficiently discharged) can be restrained from occurring. As a result, the aging is completed in a shorter time than that in the conventional art.

[E. Increase in Back Pressure]

The cleaning power generation step may include a step of performing the power generation under a condition in which the back pressure of the cathode gas channel is higher than that in the steady operation.

Generally, during the steady operation, the power generation is performed under a condition in which flooding is normally suppressed. For example, when the back pressure of the cathode gas channel is increased excessively, the produced water stays in the cathode gas channel, and flooding occurs. For that reason, during the steady operation, the back pressure of the cathode gas channel is moderately lowered to prompt the discharge of produced water.

On the other hand, when the cleaning power generation is performed under a condition in which the back pressure of the cathode gas channel is higher than that during the steady operation, the dew condensation is promoted in the cathode gas channel. As a result, the discharge of the poisonous substance is promoted.

Incidentally, an increase in the back pressure can be used not only in the cleaning power generation step but also in the heating power generation step. The heating power generation step is a step mainly aiming at raising the temperature of the fuel cell, and relative humidity during the heating power generation is not particularly limited. However, when the back pressure is increased during the heating power generation, a relatively large amount of steam is accumulated in the gas channel. When the cleaning power generation is performed from this state, a large amount of liquid water can be generated in the gas channel.

[2. Specific Example]

Hereinafter, a specific example of the method of running-in operation of the fuel cell according to the present invention will be described.

[2.1. Reduction in Time of Running-in Operation Under Control of Cooling Water Amount]

FIG. 1 illustrates a flowchart of a method of running-in operation of the fuel cell using control of cooling water amount. First, in Step 1 (hereinafter, simply referred to as "S1", as with other steps), the heating power generation is started. At this time, it is preferable to perform a low efficiency operation with a reduced stoichiometric ratio of air so as to increase the calorific value of the fuel cell. Further, it is preferable to stop the cooling water or reduce the amount of cooling water to suppress the discharge of the heat to the outside of the fuel cell. In addition, an air utilization factor may be controlled so that a cell voltage reaches a potential at which the poisonous substance is desorbed. Further, when the back pressure control is allowed, it is preferable to raise the back pressure of the cell and store moisture in the gas channel.

In S2, it is determined whether or not the temperature of the fuel cell has reached a predetermined temperature $T_1$ ($\geq$ 65° C.). If the temperature of the fuel cell is lower than $T_1$ (No in S2), the heating power generation is continued as it is. On the other hand, if the temperature of the fuel cell has reached $T_1$ (Yes in S2), the process proceeds to S3.

Incidentally, if $T_1$ is set to be relatively high, since the desorption of the poisonous substance proceeds sufficiently at the time of reaching $T_1$, it is possible to shift to the cleaning power generation immediately. On the other hand, when $T_1$ is set to be relatively low, it is preferable to continue the heating power generation until the desorption of the poisonous substance proceeds sufficiently after the temperature of the fuel cell has reached $T_1$.

Next, in S3, the cleaning power generation is started. The cleaning power generation is carried out under a condition (for example, a high current density condition) in which the produced water is increased. In other words, water produced together with the power generation is leveraged for the liquid water for discharging the poisonous substance. In addition, if the circulation amount of circulating cooling water is adjusted to an appropriate level so that the temperature in the cell is lowered as much as possible, moisture is brought into the dew condensation, and liquid water is effectively produced. Further, in order to more effectively produce the liquid water (in order to promote coalescence of moisture), it is advisable to perform pressure control so as to raise the back pressure in the cell. When the back pressure is on an underlying upward trend, the produced water is not discharged to the outside but is stored in the cell, as a result of which the coalescence of the liquid water easily progresses.

Next, in S4, it is determined whether or not a predetermined time has elapsed. The "predetermined time" in S4 means a time when the discharge of the poisonous substance by the produced water is completed. As time when the discharge of the poisonous substance is completed, it is preferable to select an optimum time according to the cleaning power generation condition. When the time of the cleaning power generation is less than a predetermined time (No in S4), the cleaning power generation is continued as it is. On the other hand, when the time has reached the predetermined time (Yes in S4), the cleaning power generation is completed.

FIG. 2 illustrates a schematic diagram of a change in the temperature during the heating power generation and the cleaning power generation with the use of a method of running-in operation of the fuel cell using control of the cooling water amount. When the heating power generation is performed in a state where the cooling water is stopped or a state where the amount of cooling water is reduced, the cell temperature rapidly increases. As a result, the desorption of the poisonous substance from the catalyst surface is promoted.

Subsequently, when the cleaning power generation is performed in a state where the cooling water flows or in a state where the amount of cooling water is increased after the cell temperature reaches $T_1$, the temperature of the fuel cell goes down. As a result, dew condensation is promoted in the gas channel, and the poisonous substance is discharged to the outside of the fuel cell before being adsorbed again on the catalyst surface.

It is known that it takes more time for the running-in operation at a low temperature as compared to a high temperature. Therefore, it is advisable to set the temperature to be high in order to shorten a running-in time. On the other hand, in order to shorten the running-in time, it is indispensable to wash out the poisonous substance with the liquid water. For example, in the environment where a device for a shipping step (so-called fuel cell evaluation bench) can be used, a high temperature source is prepared in the device to raise the temperature of the stack or a humidifier is prepared to supply moisture, thereby being capable of shortening the running-in time. However, when the running-in operation is to be implemented on a vehicle (on board), there is a problem that the heat source and a water source (humidifier) are not present in the vicinity of the vehicle.

On the other hand, with the use of the method according to the present invention, the running-in operation of the fuel cell can be performed without the use of the heat source or the water source, and the running-in time can be shortened.

[2.2. Reduction in Running-in Time of Fuel Cell with the Use of Cooling Water of Room Temperature]

FIG. 3 illustrates a schematic diagram of a fuel cell system having a quenching line for allowing water of room temperature to flow in a coolant channel of a fuel cell. Referring to FIG. 3, a fuel cell system 10a includes a fuel cell stack 12, a heat exchanger (or a heater) 14, a pump 16a, a cooling water storage tank 18, and three-way cocks 20, 22.

An outlet of the coolant channel (not shown) of the fuel cell stack 12 is connected to an inlet of the heat exchanger 14. An outlet of the heat exchanger 14 is connected to an inlet of the pump 16a. Further, an outlet of the pump 16a is connected to an inlet of the coolant channel of the fuel cell stack 12. In other words, the fuel cell system 10a is equipped with a circulation cooling system including the heat exchanger 14 and the fuel cell stack 12.

The three-way cock 20 is placed between the pump 16a and the fuel cell stack 12. The cooling water storage tank 18 is connected to one of the inlets of the three-way cock 20, and cooling water (ion-exchanged water) of a room temperature is stored in the tank. In other words, the fuel cell system 10a is equipped with the quenching line including the cooling water storage tank 18 and the fuel cell stack 12. The three-way cock 20 is configured to switch between the quenching line and the circulation cooling system.

Furthermore, the three-way cock 22 is placed between the fuel cell stack 12 and the heat exchanger 14. The three-way cock 22 is configured to discharge the cooling water of room temperature which is supplied from the cooling water storage tank 18 during quenching from the circulation cooling system.

FIG. 4 illustrates a flowchart of a method of running-in operation of the fuel cell with the use of the fuel cell system (FIG. 3) having the quenching line.

First, in S11, the heating power generation is started without allowing the cooling water to flow. Next, in S12, it is determined whether or not the temperature of the fuel cell has reached a predetermined temperature $T_1$ (≥65° C.). If the temperature of the fuel cell is less than $T_1$ (No in S12), the heating power generation is continued as it is. On the other hand, if the temperature of the fuel cell has reached $T_1$ (Yes in S12), the process proceeds to S13.

In S13, the cleaning power generation and the circulation cooling are started. Next, in S14, it is determined whether or not a predetermined time has elapsed. The "predetermined time" in S14 represents a time until the discharge of the poisonous substance by the produced water is completed. If cleaning power generation time has not reached the predetermined time (No in S14), the cleaning power generation is continued as it is. On the other hand, if the cleaning power generation time has reached the predetermined time (Yes in S14), the cleaning power generation is completed.

In S15, the three-way cocks 20 and 22 are switched to the quenching line to start the supply of the cooling water of room temperature from the cooling water storage tank 18 to the fuel cell stack 12. In S16, it is determined whether or not a predetermined time has elapsed. The "predetermined time" in S16 means the longest cooling time allowed in a production step. Since it may be undesirable to continue the cooling until the temperature of the fuel cell stack 12 reaches a target temperature from the viewpoint of the production step, a cooling time can be arbitrarily set so as to obtain required production efficiency. Since the predetermined time has not elapsed immediately after having started the quenching (No in S16), the process proceeds to S17.

In S17, it is determined whether or not the temperature of the fuel cell is equal to or lower than a predetermined temperature $T_2$ (<$T_1$). The "temperature $T_2$" in S17 represents a temperature at which the inspection is carried out. Normally, since the temperature of the fuel cell stack 12 is high (No in S17) immediately after starting the quenching, the process returns to S16. Then, the quenching is continued until the predetermined time has elapsed (Yes in S16) or until the temperature becomes equal to or lower than $T_2$ (Yes in S17).

When the predetermined time has elapsed or when the temperature of the fuel cell stack 12 has sufficiently gone down (Yes in S16 or Yes in S17), the three-way cocks 20 and 22 are switched to the circulation cooling system, and the quenching using the cooling water of room temperature is stopped. Thereafter, the process proceeds to an inspection step.

In order to shorten a tact time of production, it is necessary to perform the running-in operation at a high temperature and shorten the running-in time. On the other hand, the shipping inspection is carried out at a low temperature. For that reason, in order to shift from a high-temperature state after the running-in operation to a shipping inspection step, it is necessary to cool the fuel cell, which results in the problem of taking time to cool the fuel cell.

On the other hand, in the case where the running-in operation is performed in two stages of the heating power generation and the cleaning power generation, when the water of room temperature is supplied to the fuel cell stack with the use of the quenching line after the cleaning power generation, the temperature of the fuel cell stack can be rapidly cooled down to a temperature for the shipping inspection step.

Alternatively, when the cooling water of room temperature is supplied to the fuel cell stack with the use of the quenching line after the heating power generation, the temperature of the fuel cell stack can be promptly cooled down to the temperature for the shipping inspection step. In addition, moisture generated during the heating power generation is subjected to dew condensation in the gas channel, and put into liquid water. When the cleaning power generation is performed from this state, the liquid water rinses the poisonous substance, and the liquid water containing the poisonous substance is discharged from the gas channel. As a result, the running-in time is shortened and the process can promptly proceed to the shipping inspection step.

[2.3. Reduction in Running-in Time of Fuel Cell with the Use of Reversal of Cooling Water]

FIG. 5 is a schematic diagram of a solid polymer electrolyte fuel cell system including cooling water reversing unit that reverses a flow direction of the cooling water. Referring to FIG. 5, a fuel cell system 10h includes a fuel cell stack 12, a heat exchanger (or heater) 14, and a pump 16b.

An outlet of a coolant channel (not shown) of the fuel cell stack 12 is connected to an inlet of the heat exchanger 14. An outlet of the heat exchanger 14 is connected to an inlet of the pump 16b. Further, an outlet of the pump 16b is connected to an inlet of the coolant channel of the fuel cell stack 12. In other words, the fuel cell system 10b is equipped with a circulation cooling system including the heat exchanger 14 and the fuel cell stack 12.

Further, the pump 16b is capable of reversing a flow direction of the circulating cooling water in a reverse circulation direction (clockwise direction) to a normal circulation direction (counterclockwise direction). A right side of the fuel cell stack 12 is placed on a downstream side of the flow of the circulating cooling water at the time of the normal circulation. For that reason, the right side of the fuel cell stack 12 is equipped with a first thermometer 24 for measuring a temperature (first downstream temperature) of the circulating cooling water discharged from the fuel cell stack 12 at the time of the normal circulation. Since a heat capacity of each part of the fuel cell stack 12 is known, the inside of the stack (a center temperature) is estimated on the basis of a temperature in a downstream area of the circulating cooling water and can be leveraged for the control of the pump 16*b*.

On the other hand, a left side of the fuel cell stack 12 is placed on a downstream side of the flow of the circulating cooling water at the time of the reverse circulation. For that reason, the left side of the fuel cell stack 12 is equipped with a second thermometer 26 for measuring a temperature (second downstream temperature) of the circulating cooling water discharged from the fuel cell stack 12 at the time of the reverse circulation.

FIG. 6 is a flowchart of a method of running-in operation of the fuel cell with the use of the fuel cell system having the cooling water reversing unit (FIG. 5).

First, in S21, the heating power generation is started. Next, in S22, a flow direction of the circulating cooling water is set in the normal circulation direction with the use of the pump 16*b*. Next, in S23, it is determined whether or not a predetermined time has elapsed. The "predetermined time" in S23 means the longest heating power generation time allowed in the production step, during which the desorption of the poisonous substance can be guessed to sufficiently progress at least in the downstream area of the circulating cooling water. Since the predetermined time has not elapsed immediately after the normal circulation has started (No in S23), the process proceeds to S24.

In S24, it is determined whether or not the first downstream temperature during the normal circulation is equal to or higher than a predetermined temperature $T_1$. The "temperature $T_1$" in S24 represents the center temperature of the fuel cell stack 12 at which the desorption of the poisonous substance can be guessed to sufficiently proceed. Since the first downstream temperature is lower than $T_1$ (No in S24) immediately after the heating power generation starts in the normal circulation, the process returns to S23. The heating power generation is continued in the normal circulation state until the predetermined time elapses (Yes in S23) or the first downstream temperature reaches $T_1$ (Yes in S24).

When the predetermined time has elapsed or when the first downstream temperature has reached $T_1$ (Yes in S23 or Yes in S24), the process proceeds to S25. In S25, the pump 16*b* is used to switch the flow direction of the circulating cooling water to the reverse circulation direction. Next, in step 26, it is determined whether or not a predetermined time has elapsed. The "predetermined time" in S26 is synonymous with the "predetermined time" in S23. The "predetermined time" in S26 may be the same as or different from the "predetermined time" in S23. Since the predetermined time has not elapsed immediately after the reverse circulation has started (No in S26), the process proceeds to S27.

In S27, it is determined whether or not the second downstream temperature during the reverse circulation is equal to or higher than the predetermined temperature $T_2$. The "temperature $T_2$" in S27 is synonymous with the "temperature $T_1$" in S24. The temperature $T_2$ may be the same as or different from the temperature $T_1$. Since the second downstream temperature is lower than $T_2$ immediately after the heating power generation starts in the reverse circulation (No in S27), the process returns to S26. Then, the heating power generation in the reverse circulation state is continued until the predetermined time elapses (Yes in S26) or the second downstream temperature reaches $T_2$ (Yes in S27).

When the predetermined time has elapsed or when the second downstream temperature has reached $T_2$ (Yes in S26 or Yes in S27), the heating power generation is completed. Further, after the heating power generation is completed, the process proceeds to the cleaning power generation.

In an example illustrated in FIG. 6, the normal circulation and the reverse circulation are respectively performed once. However, the normal circulation and the reverse circulation may be alternately repeated multiple times.

In the case where power generation is performed by the fuel cell while the cooling water flows in one direction, heat transferred from the upstream area is added to heat generated in the downstream area of the cooling water. As a result, the temperature in the downstream area of the cooling water is higher than that in the upstream area of the cooling water. Because the desorption of the poisonous substance becomes more difficult to progress with a lower temperature, in order to complete the desorption of the poisonous substance even in the upstream area of the cooling water, it is necessary to perform aging for a long time.

On the other hand, if the flow direction of the cooling water is reversed during the heating power generation, the temperature non-uniformity in the cell is eliminated, as a result of which the running-in time can be shortened.

[2.4. Reduction in Running-in Time of Fuel Cell with Use of Reversal of Oxidant Gas]

FIG. 7 is a schematic diagram of a fuel cell system including an oxidant gas reversing unit that reverses a flow direction of an oxidant gas. Referring to FIG. 7, a fuel cell system 10*c* includes a fuel cell stack 12 and a humidifier 28 for humidifying the oxidant gas (air).

An inlet side of the humidifier 28 is connected to an oxidant gas supply source (not shown), and an outlet side of the humidifier 28 is connected to an inlet side of a switching valve 30. Further, two outlets of the switching valve 30 are respectively connected to both ends of a cathode gas channel of the fuel cell stack 12. The switching valve 30 is configured to switch a flow direction of the oxidant gas to any one of:

(a) the supply (normal supply) from a left side to a right side of the fuel cell stack 12; and (b) the supply (reverse supply) from the right side to the left side of the fuel cell stack 12 (oxidant gas reversing unit).

FIG. 8 illustrates a flowchart of a method of running-in operation of the fuel cell with the use of the fuel cell system (FIG. 7) including the oxidant gas reversing unit.

After the completion of the heating power generation, in S31, the cleaning power generation is started. Next, in S32, the flow direction of the oxidant gas is set to the normal supply direction with the use of the switching valve 30. Next, in S33, it is determined whether or not a predetermined time has elapsed. The "predetermined time" in S33 represents time when the discharge of the poisonous substance by the produced water is completed in more than half an area on an upstream side of the cathode gas channel. When the predetermined time has not elapsed (No in S33), the cleaning power generation with the normal supply is continued until the predetermined time has elapsed. On the other hand, when the predetermined time has elapsed (Yes in S33), the process proceeds to S34.

In S34, the flow direction of the oxidant gas is switched to a reverse supply direction with the use of the switching valve 30. Next, in S35, it is determined whether or not a predetermined time has elapsed. The "predetermined time"

in S35 is synonymous with the "predetermined time" in S33. The "predetermined time" in S35 may be the same as or different from the "predetermined time" in S33. When the predetermined time has not elapsed (No in S35), the cleaning power generation with the reverse supply is continued until the predetermined time has elapsed. On the other hand, when the predetermined time has elapsed (Yes in S35), the cleaning power generation is completed. Furthermore, after the completion of the cleaning power generation, the process proceeds to the shipping inspection step.

In the example illustrated in FIG. 8, the normal supply and the reverse supply are respectively performed once. However, the normal supply and the reverse supply may be alternately repeated multiple times.

FIG. 9 illustrates a relationship between a distance from an inlet of an air electrode and an $O_2$ concentration. When the oxidant gas is supplied from one direction, oxygen in the oxidant gas is consumed sequentially in an electrode reaction. For that reason, as indicated by a thick dashed line in FIG. 9, the oxygen concentration in the oxidant gas becomes higher on the inlet side and decreases toward the outlet side.

In order to discharge the desorbed poisonous substance to the outside of the fuel cell, a certain amount or more of produced water is necessary, and therefore there is a lowest $O_2$ concentration. However, because the oxygen concentration is reduced on the outlet side of the air electrode, the current cannot be sufficiently attracted, thereby making it difficult to proceed with cleaning using water produced by the power generation. The low oxygen concentration region is one of cause of prolonging the running-in time.

On the other hand, when the flow direction of the oxidant gas is reversed during the cleaning power generation, a portion that has been previously on the downstream side (low oxygen concentration region) of the oxidant gas can be put into a high oxygen concentration. As a result, as indicated by a solid line in FIG. 9, the low oxygen concentration region can be eliminated during the cleaning power generation. With the above configuration, the running-in operation can be accelerated in the region where the running-in time tends to take longer.

[3. Effect]

In order to complete the aging of the solid polymer electrolyte fuel cell in a short time, it is preferable to generate power under high temperature and high humidity conditions. Conceivably, this is because:
(a) the higher the temperature, the easier the desorption of the poisonous substance adsorbed by a catalyst; and
(b) the desorbed poisonous substance is washed out by the produced water before being re-adsorbed to the catalyst.

However, the solid polymer electrolyte fuel cell is generally operated steadily at 50 to 60° C., and the shipping inspection is also performed in this temperature range. For that reason, it is frequently difficult to perform the running-in operation under the high temperature and high humidity conditions suitable for the desorption of the poisonous substance. Particularly, in a state of a device equipped with a fuel cell such as a fuel cell vehicle, the running-in operation under the high temperature and high humidity conditions is normally difficult. Even if such running-in operation is possible, it takes a lot of labor and time.

On the other hand, when the heating power generation is performed under a predetermined condition, and the temperature of the fuel cell stack is raised to a temperature exceeding a steady operation temperature range, the poisonous substance adsorbed on the catalyst is promptly desorbed. Next, when the cleaning power generation is performed under the condition in which the relative humidity is 100% or more, the poisonous substance desorbed from the catalyst is washed away with the produced water before being re-adsorbing to the catalyst. As a result, the running-in time can be drastically shortened as compared with the conventional method.

More particularly, in the case where the method includes a quenching step of supplying the water of room temperature to the fuel cell stack from the outside, dew condensation occurs in the gas channel, and a state in which the relative humidity is 100% can easily be created. In addition, since the fuel cell stack can be cooled down to an inspection temperature in a short time, the shipping inspection can be promptly performed after the running-in operation is completed.

The method according to the present invention makes it possible to easily produce the high temperature and high humidity state suitable for the desorption of the poisonous substance, and furthermore does not necessarily need to use a heat source or a humidifier for that purpose. For that reason, the method according to the present invention can be applied not only to the aging of the solid polymer electrolyte fuel cell immediately after production but also to the refreshment of the solid polymer electrolyte fuel cell mounted in various devices.

EXAMPLES

Example 1

[1. Test Method]

Simulation was performed to find a change in a cell temperature when cooling water of room temperature is supplied to a coolant channel of a fuel cell stack after the completion of heating power generation. FIG. 10 illustrates a model diagram of the fuel cell stack used for calculation of heat conduction. The cell temperature before the cooling water was injected was set to 80° C.

In addition, a method of injecting the cooling water was selected from among:
(a) a method of continuously supplying the cooling water of room temperature (20° C.) at a supply speed corresponding to an infinite pumping capacity (continuous water injection);
(b) a method of supplying the cooling water of room temperature (20° C.) of an amount corresponding to a volume of the coolant channel to the coolant channel (single water injection); and
(c) a method of repeating the "single water injection" every 5 seconds (intermittent water injection).

[2. Results]

FIG. 11 illustrates the transition of a center temperature of an MEGA and the cooling water during the continuous water injection and the single water injection. FIG. 12 illustrates the transition of the center temperature of the MEGA and the cooling water during the intermittent water injection. The "center temperature of the MEGA" represents the center temperature of the MEGA of the center cell in the fuel cell stack. In addition, the "center temperature of the cooling water" represents the center temperature of the coolant channel of the center cell in the fuel cell stack. The following facts are found from FIGS. 11 and 12.

Even in the case of the single water injection, the center temperature of the MEGA reaches 55° C. in 18.5 seconds. In addition, in the case of the intermittent water injection, the center temperature of the MEGA reaches 55° C. in 9 seconds. Furthermore, in the case of the continuous water injection, the center temperature of the MEGA reaches 55° C. in only 3 seconds.

Reference Example 1

[1. Test Method]

Aging was carried out for 5 minutes while keeping the temperature of the unit cell constant. The cell temperature during aging was set to 55° C. to 80° C. In addition, during aging, a voltage was set to 0.1 V and a current density was set to 1 A/cm$^2$. The oxygen concentration was adjusted to 5 to 10% so as to satisfy the abovementioned voltage and current conditions. A stoichiometric ratio of air was set to 10 times or more.

[2. Results]

FIG. 13 illustrates aging temperature dependence of a cell voltage (@ 1 A/cm$^2$) after aging for 5 minutes. It is found from FIG. 13 that aging hardly progresses when the aging temperature is 55° C. and that the cell voltage after aging becomes higher as the aging temperature is higher.

Reference Example 2

[1. Test Method]

Aging was carried out for 5 minutes while keeping the current density of the unit cell constant. The current density during aging was set to 0.1 to 3 A/cm$^2$. In addition, during aging, the cell temperature was set to 65° C., the voltage was set to 0.1 V, and the current density was controlled with a change in the $O_2$ concentration in the oxidant gas.

[2. Results]

FIG. 14 illustrates current density dependence during aging of a cell voltage (@ 1 A/cm$^2$) after aging for 5 minutes. Numerical values in FIG. 14 show the oxygen concentrations in the oxidant gas during aging. It is found from FIG. 14 that aging hardly progresses when the current density is less than 1 A/cm$^2$ and that the oxygen concentration in the oxidant gas during aging is preferably 5% or more.

Although the embodiment according to the present invention has been described in detail, the present invention is not limited to the above embodiment at all, and various modifications are possible without departing from the spirit of the present invention.

The running-in method of the fuel cell according to the present invention can be used for the aging of the solid polymer electrolyte fuel cell immediately after production and the refreshment of the solid polymer electrolyte fuel cell whose performance has deteriorated during use.

What is claimed is:

1. A method of running-in operation of a fuel cell, consisting of:
    a single heating power generation step of supplying a reaction gas to a fuel cell stack including a laminate of solid polymer electrolyte fuel cells and performing power generation so that a temperature of the fuel cell stack reaches 65° C. or higher and thereby promoting desorption of a poisonous substance from a surface of a catalyst, wherein during the single heating power generation step, air is provided and relative humidity of less than 100% is maintained;
    and after completion of the single heating power generation step,
    a single cleaning power generation step of supplying the reaction gas to the fuel cell stack and performing power generation under a condition in which relative humidity is 100% or more and thereby discharging the poisonous substance desorbed from the catalyst surface during the single heating power generation step to outside of the fuel cell together with liquid water before the poisonous substance desorbed from the catalyst surface during the single heating power generation step is reabsorbed to the catalyst surface.

2. The method according to claim 1, wherein the single heating power generation step performs power generation so that the temperature of the fuel cell stack reaches 80° C. or higher.

3. The method according to claim 1, further comprising a quenching step of supplying cooling water of room temperature to the fuel cell stack from the outside (a) before the single cleaning power generation step is performed after the single heating power generation step is completed, or (b) after the single cleaning power generation step is completed.

4. The method according to claim 1, wherein performing the power generation in the single heating power generation step includes is at least one selected from the group consisting of:
    (a) performing the power generation under a condition in which a stoichiometric ratio of air becomes lower than that in steady operation;
    (b) performing the power generation under a condition in which an air utilization factor becomes higher than that in the steady operation; and
    (c) performing the power generation under a condition in which a cell voltage becomes a desorption potential of a poisonous substance.

5. The method according to claim 1,
    wherein each of the single heating power generation step and the single cleaning power generation step includes performing the power generation while circulating cooling water between the fuel cell stack and a heat exchanger, and
    an amount of the cooling water in the single heating power generation step is smaller than an amount of the cooling water in the single cleaning power generation step.

6. The method according to claim 1, wherein the single heating power generation step includes performing the power generation without allowing cooling water to flow in the fuel cell stack.

7. The method according to claim 1, wherein during the single heating power generation step, cooling water is circulated by alternately repeating normal circulation for circulating the cooling water in one direction between the fuel cell stack and a heat exchanger and reverse circulation for reversing a flow direction of the cooling water.

8. The method according to claim 1, wherein the single cleaning power generation step includes performing the power generation under a condition in which a current density is 1 A/cm$^2$ or more.

9. The method according to claim 1, wherein during the single cleaning power generation step, alternately repeating normal supply of oxidant gas for allowing the oxidant gas to flow in one direction within the fuel cell stack and reverse supply of oxidant gas for reversing a flow direction of the oxidant gas within the fuel cell stack.

10. The method according to claim 1, wherein the single cleaning power generation step includes performing the power generation under a condition in which a back pressure of a cathode gas channel is higher than that in steady operation.

* * * * *